No. 822,535. PATENTED JUNE 5, 1906.
H. C. MILLER.
LOCATING GAGE FOR SEWING MACHINES.
APPLICATION FILED AUG. 11, 1903.
2 SHEETS—SHEET 2.
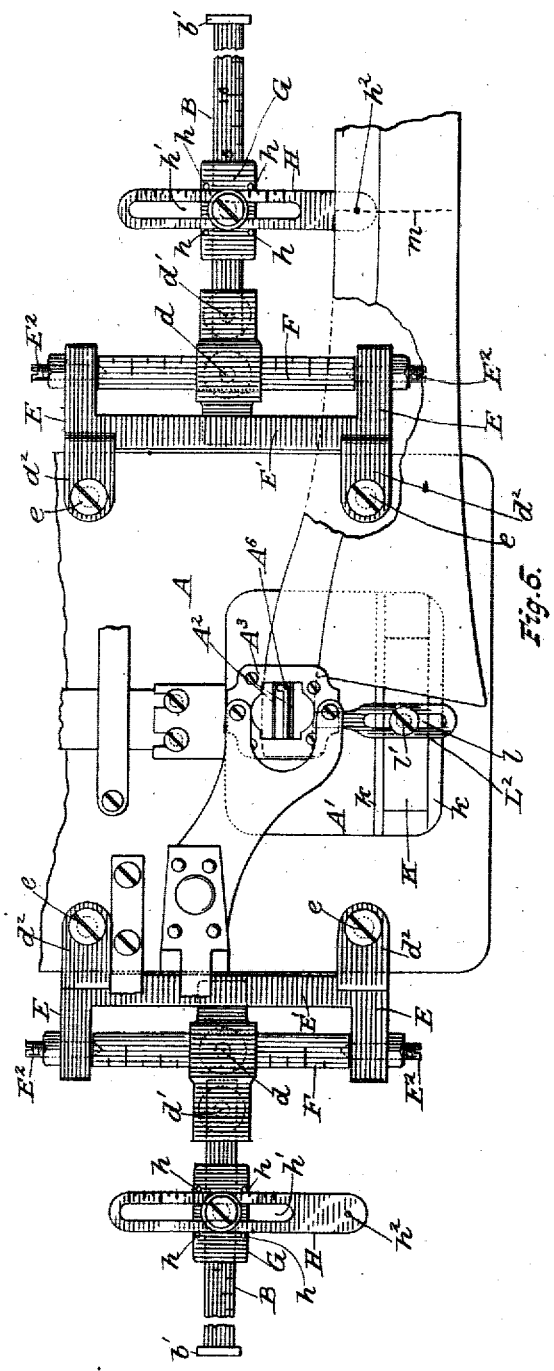
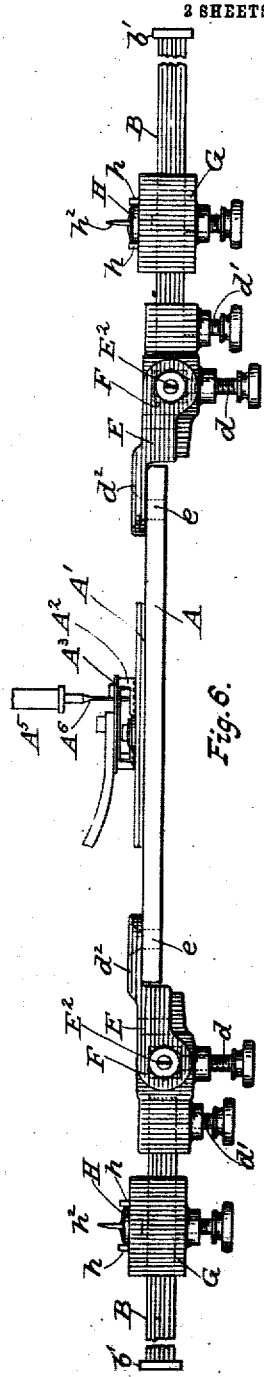
Witnesses.
Henry C. Miller,
Inventor,
by Alex. Selkirk.
Attorney

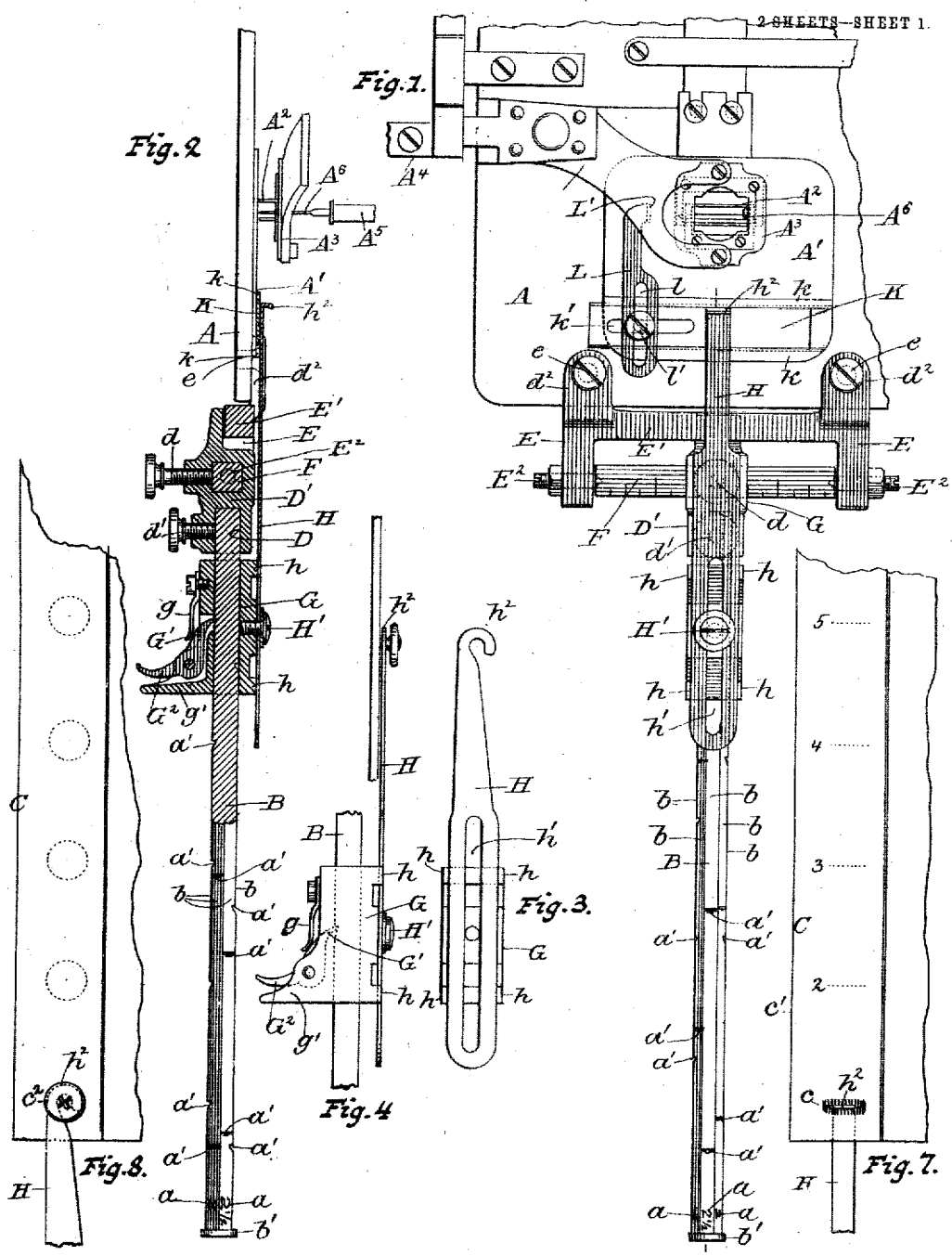

UNITED STATES PATENT OFFICE.

HENRY C. MILLER, OF WATERFORD, NEW YORK.

LOCATING-GAGE FOR SEWING-MACHINES.

No. 822,535.      Specification of Letters Patent.      Patented June 5, 1906.

Application filed August 11, 1903. Serial No. 169,078.

*To all whom it may concern:*

Be it known that I, HENRY C. MILLER, a citizen of the United States, residing at Waterford, in the county of Saratoga and State of New York, have invented new and useful Improvements in Locating-Gages for Sewing-Machines, of which the following is a specification.

My invention relates to improvements in sewing-machine attachments, and particularly to means arranged in connection with a sewing-machine for locating or positioning articles to be operated upon.

The object of the invention is to provide means whereby the material to be operated upon may be quickly and accurately located relative to the needle to form buttonholes or place buttons on articles at a predetermined distance from a selected point or equidistance apart.

To this end my invention consists in providing an adjustable support, a carrier adjustably mounted thereon, and a locating means adjustably mounted on the carrier.

In placing buttonholes or buttons it is of the utmost importance that the various adjustments of the locating means be made in accordance with a prearranged scale or scales, so as to meet the various requirements incident to change of size of the article to be operated upon and the different style machines to which my invention may be applied. I have therefore provided a series of graduated scales on the support to determine the position of the locating means for what may be termed "standard" sizes and a second compensating adjustment to cover minor distances between the standard scale. The scales and adjustments coöperating therewith enable me to quickly determine the position of the locating means with respect to the stitching mechanism or work-support, so that a buttonhole or button may be conveniently located at a fixed distance from a determinate point.

A further object of my invention is to provide a support for a locating means having a series of graduated scales thereon in different lines and adapted to be removed and adjusted to position either of said scales to coöperate with the locating means. With this construction a wide range of adjustment is provided without making the support unnecessarily long and awkward.

Other objects and advantages will be hereinafter referred to, and particularly pointed out in the claims.

In the drawings, Figure 1 is a plan view of my invention applied to a buttonhole-machine. Fig. 2 is a section on the line 1 1, Fig. 1. Fig. 3 is a detail view of a button-locator. Fig. 4 is a side elevation of the same. Fig. 5 is a plan view of a portion of a buttonhole-machine, showing the application of two locating-gages. Fig. 6 is an elevation of the same. Fig. 7 is a view illustrating a piece of fabric provided with a series of equally-spaced buttonholes therein and the locator engaging one of said buttonholes. Fig. 8 is a similar view showing a series of equally-spaced buttons and the button-locator.

In the drawings, A represents a sewing-machine table; A', a cloth-plate; A², a cloth-clamping device; A³, a lever for raising the presser-foot; A⁴, a needle-bar, and A⁵ a needle.

B indicates a support extending from the sewing-machine, and it may be cylindrical, square, hexagonal, or other convenient form, and it is formed with a series of parallel planes $b$. On each plane $b$ I provide a series of equally-spaced notches $a'$ and a scale-mark $a$ to indicate the distance between the notches to locate buttonholes or buttons a predetermined distance apart. The support B is fitted in a socket D, formed in a bracket D', mounted on a transverse bar F, pivoted by adjusting-screws E² E³ in arms E E of a frame. The arms E E are connected by a bar E', from which extend ears $d^{x}$, through which set-screws $e$ pass to secure the device to the sewing-machine. A set-screw $d'$ secures the support in the socket D, and a set-screw $d$ secures the bracket to the transverse bar F, the latter having a graduated scale to determine the transverse adjustment of the gage relative to the needle. Bracket D' is provided with an extension $d^{x}$, which engages the under side of bar F to hold the support B in proper position when in use.

A carrier G is slidably mounted on the support B, prevented from being moved off at the end by the collar $b'$. A finger or detent G' is pivoted in the lower side of the carrier and coöperates with the indicating-notches $a'$ to position a locator to be described. An extension G² of the finger and an extension $g'$ of the carrier serve as a means for moving the carrier freely on the support, while a spring $g$ retains the finger in operative position.

Adjustably mounted on the carrier is a locator-bar H, formed near one end with a slot $h'$ and having a locator $h^2$ at the opposite end. A set-screw H′ passes through the slot $h'$ to the carrier to permit adjustment of the locator toward or from the needle in alinement with the movement of the carrier on its support.

The locator may be of any preferred form and may operate in conjunction with a previously-formed buttonhole, as shown in Figs. 1 and 2, and for use in connection with buttons, as shown in Fig. 4. When operating upon an article having neither a buttonhole nor button, a locator in the form of a pin may be used, as shown in Figs. 5 and 6.

K is a plate adapted to slide between ways $k$ $k$ on the table A and is formed with a slot $k'$. An adjustable gage L, having a slot $l$, is mounted on the plate K, and passing through its slot and slot $k'$ is a set-screw $l'$, to fix the gage after it has been properly adjusted. By means of this adjustment the gage end L′ may be moved laterally toward or from the locator $h$ and longitudinally in either direction to properly guide the article being treated.

In operation the operator will determine the scale $a$ on the support B to be used, and if the selected scale does not accurately position the locator relative to the needle the compensating adjustment of the locator will be brought in to use. For instance, if the parts are positioned as shown in Fig. 1, wherein the two and one-half scale is positioned to coöperate with the carrier and the graduations do not accurately locate the locator, the operator will then release the screw H′ and adjust said locator to the desired position, after which screw H′ will be tightened. Then the gage L is adjusted, when the device is ready for use. The locator engages the fabric, and if a series of buttonholes or buttons are to be placed an equidistance apart the carrier is moved to the first graduation and a buttonhole is formed. Then the carrier is moved to the next graduation, and so on until the series of operations are completed, after which the article is removed and another applied, when the carrier is moved toward the sewing-machine to repeat the operation.

Obviously the invention is not limited to gaging a series of buttonholes, as it may be used to locate a single buttonhole relative to a determinate point where it is required that buttonholes or buttons be placed at a given point in a series of articles—such, for instance, as collars, cuffs, &c.

The support B has what may be termed an "axial" adjustment in its socket to bring into position one of the series of graduations, while at the same time it may be transversely adjusted on the bar F to position the article so as to be operated upon at the desired distance from its edge.

In Figs. 5 and 6 I have shown a locator mounted each side the sewing-machine. However, the parts are somewhat altered. The carrier is mounted to slide on its support; but the finger is omitted. Pins $h^x$ project up from the carrier to the guide and hold the locator-bar H, which is slotted and provided with a graduated scale. A set-screw secures the parts in position, and a pin $h^2$ on the locator-bar forms a locator to engage the fabric.

In conjunction with the use of two locators I employ an adjustable gage $L^2$ to gage a collar-tab, as clearly shown on Fig. 5.

When using the double locator to stitch a collar O, the latter is folded to find the center $m$, at which point the locator $h^2$ engages it, and the tab or adjacent portion will be against the gage $L^2$, when the end buttonhole will be stitched. After one end buttonhole has been formed the collar is removed from one locator, and the same point in the fabric is engaged by the locator on the other side of the machine, as will be readily appreciated by reference to the drawings.

While I have described how a collar may be operated upon by using two locators, obviously collars, cuffs, and the like can with convenience be operated upon by the structure shown in Figs. 1 to 4; but, as a matter of convenience in handling, two locators may be used, if desired.

What I claim is—

1. In combination, a sewing-machine, a support projected horizontally outward from the sewing-machine, a series of notches formed in said support, a carrier mounted on the support and adapted to be moved thereon in either direction, an adjustable locating-bar provided at its free end with a locator for engagement with a piece of fabric which is to receive buttonholes or buttons, and a finger carried by the carrier which coöperates with the notches, said finger holding the locator at a predetermined point relative to the sewing-machine.

2. In combination, a sewing-machine provided with a work-table and a needle, a support provided with one or more series of notches and projected horizontally from the sewing-machine, a carrier loosely mounted on said support for movement in either direction, a finger carried by the carrier to coöperate with the notches in the support, a locating-bar mounted on the carrier, means for adjusting the locating-bar, the free end of the locating-bar extending over the table of the sewing-machine, and toward the needle of the same, and a locator on the locator-bar for engaging a piece of fabric while it is being moved, said locator being held at a predetermined point relative to the sewing-machine by the means for adjusting the locating-bar.

3. In combination, a sewing-machine, a support projected horizontally from the sewing-machine and having formed in it one or more series of notches, a movable carrier mounted on the support, a device carried by said carrier which coacts with the notches to hold the carrier fast on the support, a locating-bar adjustably mounted on the carrier and having its end toward the sewing-machine provided with a locator for engagement with a piece of fabric which is to receive buttonholes or buttons.

4. In combination, a sewing-machine, a support projected horizontally from the sewing-machine, a movable carrier on the support, an adjustably-mounted locating-bar carried by said carrier, a locator connected with the inner end of the locating-bar for engaging a piece of fabric which is to receive buttonholes or buttons, and mechanism carried by the movable carrier for holding the latter secured on the support at a predetermined point with relation to the sewing-machine.

5. In combination, a sewing-machine, a support on the sewing-machine, a series of equally-spaced notches formed on the support, a carrier which is movable on the support, a locator between the needle of the sewing-machine and the carrier, means connecting the locator with the carrier, and mechanism connected with the carrier for engagement with any one of the notches of the support to set and hold the locator at a predetermined point relative to the sewing-machine.

6. In combination, a sewing-machine, a support having its inner end secured to the sewing-machine, a movable carrier on the support, a finger pivoted on said carrier, a spring for forcing the finger into holding engagement with said support, an extension on the finger for releasing it from the support and for moving the carrier away from the needle of the sewing-machine, and a locator mounted on the carrier, the finger holding the locator at a fixed point relative to the needle.

7. In combination, a sewing-machine, a pair of brackets yoked together, means securing the brackets to the sewing-machine, a bar mounted on the brackets, a bracket adjustably mounted on the bar, means for locking the adjustable bracket to the bar, a socket formed in the adjustable bracket, a horizontally-extended support fitting in the socket, a carrier movable on the horizontal support, and means carried by the carrier for locating a piece of fabric at a predetermined point relative to the sewing-machine.

8. In combination, a sewing-machine, brackets suitably secured thereto, a transverse bar pivoted in the brackets, a middle bracket mounted on said pivoted transverse bar and adjustable thereon, a set-screw for holding said bracket in place from accidental movement, a stop projected rearward from said adjustable middle bracket and having bearing against a stationary part, a socket formed in the bracket, a set-screw coöperating with the socket, a horizontal support projecting from said socket, whereby said support may be moved laterally from a line in alinement with the needle of the sewing-machine and be folded up and down over the table of the machine when not in operation, and means mounted on the horizotal support for locating a piece of fabric at a predetermined point relative to the sewing machine.

9. In combination, a sewing-machine, a support projecting from the machine, a plurality of differently-spaced series of marks on the support, said support being removable to operatively present one or the other of said series of marks, a locator having means for engaging the article being operated upon, means coöperating with the marks to indicate the position of the locator relative to the sewing-machine, and means for holding the support to the machine.

10. A device of the character described, comprising a bracket, a rocking bar mounted in the bracket, a support adjustably mounted on the rocking bar, a series of indicating-points on the support, and a locator, the indicating-points indicating the position of the locator.

11. A device of the character described, a supporting-bar, means on which the supporting-bar is mounted, a scale on the supporting-bar, a support mounted on the supporting-bar and adjustable with relation to said scale, a scale on the support, an adjustable locator-bar carried on the said support and adjustable with relation to the scale on said support, and a locator on the locator-bar.

12. A gage for a sewing-machine, comprising a support formed with predetermined indicating-points thereon, a carrier movably mounted on the support, a locator on the carrier, and means for adjusting the locator independently of its movement on said support.

13. In combination, a sewing-machine, a support projecting outwardly from the machine, and an adjustable locator mounted on the support, means for moving the locator and fixing it at intervals to move and hold while moving a piece of fabric to receive buttonholes or buttons at predetermined points, and means for guiding the fabric while the locator is being moved.

14. In combination, a sewing-machine, a support projecting outwardly from the machine, sets of notches formed on the support, each set of notches being differently spaced and arranged in different alinement, a locator having means for engaging an article being operated upon, means attached to the locator for engaging one of a selected series of notches, and means for removably holding the support to the machine, to permit the setting of the support to operatively present either of said sets of notches.

15. In a device of the character described comprising a support formed with a plurality of series of differently-spaced marks, a locator slidably mounted on the support and adjustable with relation to said marks, and means for adjusting the support to operatively present any one series of said marks to serve as a gage in the adjustment of the locator.

16. A gage for a sewing-machine, comprising a support formed with indicating-points thereon, a carrier movable on the support, a locator carried by the carrier, and means for adjusting the locator independent of its movement on the support and in alinement with said support.

17. A locator for a sewing-machine, comprising a support adapted to extend from a sewing-machine, indicating-points formed on the support, a carrier slidably mounted on the support, a locator carried by the carrier, and means for adjusting the locator in line with the support independent of its movement on said support.

18. A gage for a sewing-machine, comprising a support formed with a series of indicating-points, a carrier adapted to move on the support and in alinement therewith, a locator carried by the carrier, and means for adjusting the locator in alinement with the support and independent of the movement of the carrier on said support.

19. A gage for sewing-machines comprising locating means, a carrier therefor upon which said locating means is adjustably mounted, a support for the carrier upon which said carrier is adjustably mounted, the two said adjustments being in the same direction, the gage having an indicating-scale for indicating the position of the locating means with respect to its support, and means mounted on the carrier for holding the same and the locating means in a determinate position, said latter means serving as a finger-grip in the movement of the carrier.

20. In a gage for sewing-machines, the combination with locating means, of a suitable support therefor, said locating means and support provided the one with a graduated scale and the other with a portion arranged to register therewith, and having two adjustments, one an adjustment of said locating means with respect to its support to various positions along the said graduated scale, and the other an independent compensating adjustment for adjusting the relationship of said locating means with respect to the said scale-graduations.

21. In a gage for sewing-machines, the combination with locating means, of a suitable support therefor, said locating means and support provided the one with a graduated scale and the other with a portion arranged to register therewith, and having two adjustments, one an adjustment of said locating means with respect to its support to various positions along the said graduated scale, and the other an independent compensating adjustment for adjusting the relationship of said locating means with respect to the said scale-graduations; and means for adjustably securing the said support to the bed of a sewing-machine, the direction of said adjustment being at right angles to the direction of the other said adjustments.

22. In a gage for sewing-machines, the combination with a support provided with a graduated scale, of a carrier thereon having a finger arranged to register with the graduations of said support, and a locator adjustably mounted upon said carrier, whereby the same may be adjusted with respect to the position of said finger.

23. In a sewing-machine, the combination with a work-clamp, and a support secured to and extending outwardly from said machine and provided with a graduated scale, and a locating means adjustably mounted upon said support and capable of adjustment thereon toward and away from the said work-clamp, and provided with an indicator for registering with the graduations of said scale.

24. A gage for a sewing-machine comprising a locator to engage a buttonhole or a button, a support on which said locator is mounted, the gage having an indicating-scale representing predetermined sizes of articles to be operated upon, and means for adjusting the locator, said latter adjustment being a compensating adjustment to compensate for minor distances between the indicating-scale.

25. In a gage for sewing-machines, the combination with a support provided with a plurality of indicating-notches, means for securing said support to a sewing-machine, locating means carried by said support provided with a finger arranged to register with said notches, yielding means for holding said finger in engagement with any one of the said notches, and means by which the locating means may be manually operated and adjusted, the manual movement of the locating means on the support causing disengagement of the finger from the notch.

26. In a sewing-machine, the combination with a work-clamp and a support secured to a portion of the machine stationary with respect to said work-clamp, of a locating means carried by said support and capable of adjustment thereon toward and away from said work-clamp, and a side gage carried by said sewing-machine.

27. In a device of the character set forth, the combination of locating means, a carrier therefor, an axially-adjustable support for the carrier, and a series of indicating-scales on the support, said scales being in different alinement.

28. In a device of the character set forth, the combination of locating means, a carrier therefor, an axially-adjustable support for the carrier, a series of indicating-scales on the support, said scales being in different alinement and means for adjustably securing the carrier to the support at regular intervals which vary according to the relative axial adjustment of the support.

29. In combination, locating means, a carrier therefor, a transversely-adjustable support upon which the said carrier is longitudinally adjustable, and a plurality of scales on the support, and means for locating any one of the plurality of scales to determine the movement of the locater.

30. In combination, a locator, means for adjusting the locator on a carrier, a support bearing a scale, a carrier adjustably mounted on the support, means for adjusting the support relative to a needle of a sewing-machine, and means for retaining the carrier on its support after it has been adjusted.

31. In a device of the character described, the combination of locating means, a carrier therefor, a support for the carrier, a plurality of scale-graduations in different alinements to determine the location of the locator, and means for positioning the support to present a selected scale.

32. In a gage attachment for a sewing-machine, the combination with a locator adjustably mounted on a carrier, means for adjusting the locator on the carrier toward and from the sewing-machine, a carrier, a support, means for securing the support to a sewing-machine, means for adjusting the carrier toward and from the sewing-machine, and a scale to determine the position of the locator.

HENRY C. MILLER.

Witnesses:
CHARLES SELKIRK,
CHAS. R. SELKIRK.